(12) United States Patent
Watanabe et al.

(10) Patent No.: US 12,046,130 B2
(45) Date of Patent: Jul. 23, 2024

(54) SPORTS STATUS PRESENTATION SYSTEM

(71) Applicant: NIPPON TELEGRAPH AND TELEPHONE CORPORATION, Tokyo (JP)

(72) Inventors: Junji Watanabe, Tokyo (JP); Akiko Hayashi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 168 days.

(21) Appl. No.: 17/797,668

(22) PCT Filed: Feb. 6, 2020

(86) PCT No.: PCT/JP2020/004505
§ 371 (c)(1),
(2) Date: Aug. 4, 2022

(87) PCT Pub. No.: WO2021/156997
PCT Pub. Date: Aug. 12, 2021

(65) Prior Publication Data
US 2023/0060407 A1    Mar. 2, 2023

(51) Int. Cl.
*H04B 3/36* (2006.01)
*G08B 6/00* (2006.01)

(52) U.S. Cl.
CPC ..................... *G08B 6/00* (2013.01)

(58) Field of Classification Search
CPC .................. G08B 6/00; G09B 19/0038; A63B 2071/0655; A63B 2243/0066
See application file for complete search history.

(56) References Cited

U.S. PATENT DOCUMENTS

| | | | |
|---|---|---|---|
| 8,702,538 B1 * | 4/2014 | Coffin | G09B 19/0038 473/422 |
| 9,625,321 B2 * | 4/2017 | Cavallaro | G01J 5/0022 |
| 11,207,582 B2 * | 12/2021 | Lewis | A63B 69/40 |

OTHER PUBLICATIONS

Hayashi et al. (2019) "Sports Social View—Inclusive sports watching that extracts the essence of sports and shares them with the physical sense" NTT Technical Journal, vol. 31, No. 12, pp. 29-32.

* cited by examiner

*Primary Examiner* — Toan N Pham

(57) ABSTRACT

The present invention provides a sport status presentation system with which a user can easily grasp, by touch, the status of a sport competition in which two teams compete and the players on the two teams capture a single ball from each other while moving within a single competition area and score points by placing the ball in a goal set for each team. The sport status presentation system includes two vibrating bodies, the vibrating bodies respectively apply vibration to sites on the left side and the right side of the body of the user and are allocated to the respective teams, and the vibrating body allocated to the team in possession of the ball, among the two vibrating bodies, vibrates by a larger amount as a distance between the ball and the goal or a goal line of the team in possession of the ball decreases.

20 Claims, 14 Drawing Sheets

SPORTS STATUS PRESENTATION SYSTEM

CROSS-REFERENCE TO RELATED APPLICATIONS

This application is a U.S. National Stage Application filed under 35 U.S.C. § 371 claiming priority to International Patent Application No. PCT/JP2020/004505, filed on 6 Feb. 2020, the disclosure of which is hereby incorporated herein by reference in its entirety.

TECHNICAL FIELD

The present invention relates to a technique for presenting to a user, by means of vibration, the status of a sport competition such as a soccer, rugby, basketball, or ice hockey match, for example, in which two teams compete and the players on the two teams capture a single ball, puck, or the like from each other while moving within a single competition area and score points by placing the ball, puck, or the like in a goal set for each team.

BACKGROUND ART

A technique disclosed in NPL 1 is available as prior art for presenting the status of a sport competition by means of vibration. NPL 1 discloses a device that includes a vibration surface taking the shape of a tennis court reduced in size and that causes a position on the vibration surface corresponding to the position of a ball or a player on the tennis court to vibrate.

CITATION LIST

Non Patent Literature

[NPL 1] Hayashi, Watanabe, and Shimizu: "Sports Social View—Method of Inclusive Sports Appreciation Extracting and Sharing the Essence of Sports through the Sense of Touch", NTT Technical Review, Vol. 31, No. 12, pages 29-32, 2019.

SUMMARY OF THE INVENTION

Technical Problem

The user of the device of NPL 1 can grasp the progress status of a tennis match by placing the palm of the hand on the vibration surface. With the device of NPL 1, however, it is difficult for the user to grasp the progress status of a sport competition such as a soccer match, as described above, in which the players of two teams capture a single ball from each other while moving within a single competition area.

An object of the present invention is to provide a sport status presentation system with which a user can easily grasp the status of a sport competition such as a soccer or ice hockey match, as described above, in which two teams compete and the players on the two teams capture a single ball, puck, or the like from each other while moving within a single competition area and score points by placing the ball, puck, or the like in a goal set for each team.

Means for Solving the Problem

To solve the problem described above, a sport status presentation system according to an aspect of the present invention includes a vibration presentation unit for presenting to a user, by touch, the status of a sport competition in which two teams compete and the players on the two teams capture a single ball from each other while moving within a single competition area and score points by placing the ball in a goal set for each team. The vibration presentation unit includes two vibrating bodies, the vibrating bodies respectively apply vibration to sites on the left side and the right side of the body of the user and are allocated to the respective teams, and at each point during the sport competition, the vibrating body allocated to the team in possession of the ball, among the two vibrating bodies, vibrates by a larger amount as a distance between the ball and the goal of the team in possession of the ball or a goal line of the team in possession of the ball decreases.

Effects of the Invention

According to the present invention, a user can easily grasp the status of a sport competition such as a soccer or ice hockey match, as described above, in which two teams compete and the players on the two teams capture a single ball, puck, or the like from each other while moving within a single competition area and score points by placing the ball, puck, or the like in a goal set for each team.

DESCRIPTION OF EMBODIMENTS

Embodiments of the present invention will be described below with reference to the figures. A sport competition serving as the subject of the present invention is a soccer, rugby, basketball, or ice hockey match, for example, in which two teams compete, the players on the two teams capture a single ball from each other while moving within a single competition area and score points by placing the ball in a goal set for each team, and the team with the highest score at the end point of the competition wins. These competitions include competitions such as ice hockey matches, in which an object not referred to as a ball is normally used instead of a ball, but hereafter, the object, such as a ball or a puck, that is captured during these competitions will be referred to as a ball. These competitions are played in either a rectangular competition area or a substantially rectangular competition area in which the vertices of the rectangle are arc-shaped, and the competition area is referred to as a field, a pitch, a court, a rink, or the like. The competition area includes a goal set for one of the teams on or near one short side of the rectangle and a goal set for the other team on or near the other short side of the rectangle.

Figure 1:
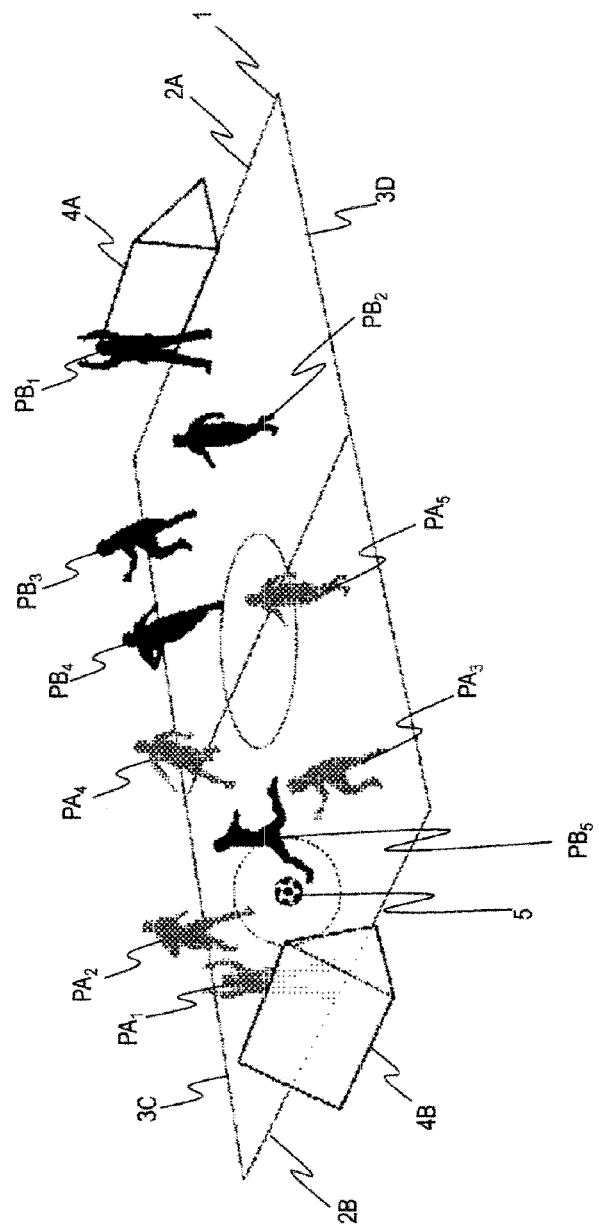
FIG. 1 is a view showing an example of a competition area for five-a-side soccer for the visually impaired and a competition status.

Five-a-side blind soccer for the visually impaired, in which two teams, namely team A and team B, compete will be described below as an example. FIG. 1 is a schematic view showing an example of a competition area for five-a-side soccer for the visually impaired and a competition status. The competition area for five-a-side soccer for the visually impaired is referred to as a pitch. A pitch 1 is a four-sided rectangle including goal lines 2A, 2B constituted by the short sides and touch lines 3C, 3D constituted by the long sides. Goals 4A, 4B having a predetermined width and a predetermined height and having a width direction center point in the center point of the goal line are arranged respectively on the goal lines 2A, 2B. It is assumed here that the goal set for team A (the goal used by team A to score points) is the goal 4A arranged on the goal line 2A, and the goal set for team B (the goal used by team B to score points) is the goal 4B arranged on the goal line 2B. Further, it is assumed that on the pitch 1, a total of five players, namely a single player $PA_1$ who plays as the goalkeeper and four players $PA_2$, $PA_3$, $PA_4$, and $PA_5$ other than the goalkeeper who play as field players, compete for team A, and a total of five players, namely a single player $PB_1$ who plays as the goalkeeper and four players $PB_2$, $PB_3$, $PB_4$, and $PB_5$ other than the goalkeeper who play as field players, compete for team for team B. In the status shown in FIG. 1, the player $PB_5$ of team B is positioned near the goal 4B and is about to kick the ball toward the goal 4B.

First Embodiment

Figure 2:
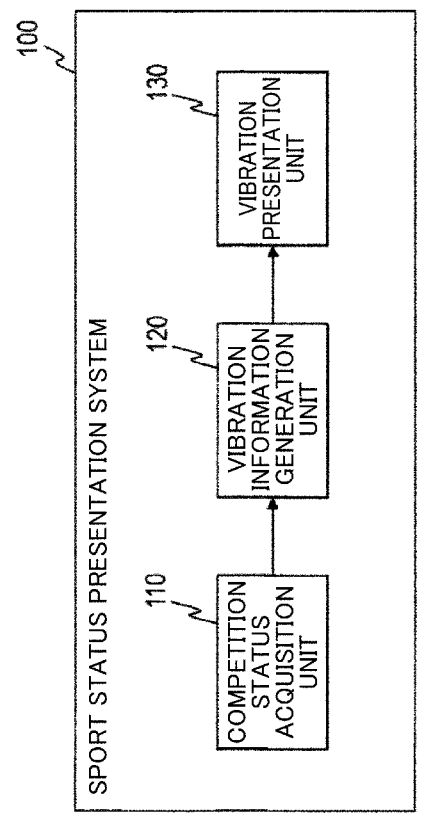
FIG. 2 is a view showing an example functional configuration of a sport status presentation system 100 according to a first embodiment.

A sport status presentation system according to a first embodiment includes two vibrating bodies. The vibrating bodies respectively apply vibration to sites on the left side and the right side of the body of a user, and the competing teams are respectively allocated in advance to the vibrating bodies such that at each point during the subject sport competition, the vibrating body allocated to the team in possession of the ball is caused to vibrate by a greater amount as the distance between the ball and the goal of the team in possession of the ball decreases. A functional configuration of the sport status presentation system 100 according to the first embodiment is as shown in the example in FIG. 2, and includes a competition status acquisition unit 110, a vibration information generation unit 120, and a vibration presentation unit 130.

[Competition Status Acquisition Unit 110]

The competition status acquisition unit 110 acquires information indicating the team in possession of the ball and information indicating the distance between the ball and the goal of the team in possession of the ball at each point during the sport competition, and outputs the acquired information to the vibration information generation unit 120. Any method may be used as a method for acquiring the information, and three examples are illustrated below. Note that here, "the goal of the team in possession of the ball" is the location serving as the point-scoring target at the current point during the subject sport competition, this location being a goal in the case of soccer or ice hockey and a basket in the case of basketball. In the case of rugby and American football, the goal line may be set as "the goal of the team in possession of the ball", and immediately after a try in rugby or a touchdown in American football, the goal itself may be set as "the goal of the team in possession of the ball".

[[First Example of Competition Status Acquisition Unit 110]]

Figure 3:
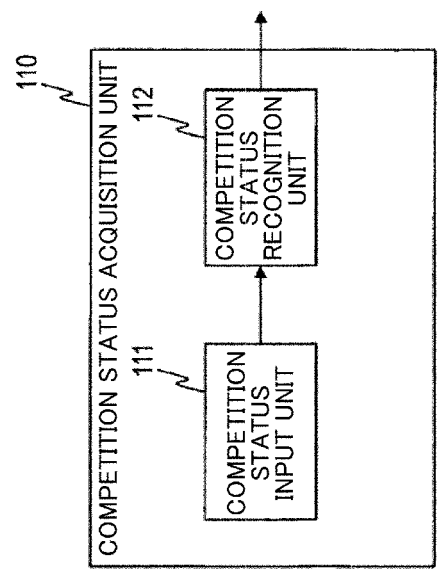
FIG. 3 is a view showing an example functional configuration of a first example of a competition status acquisition unit 110.
Figure 4:
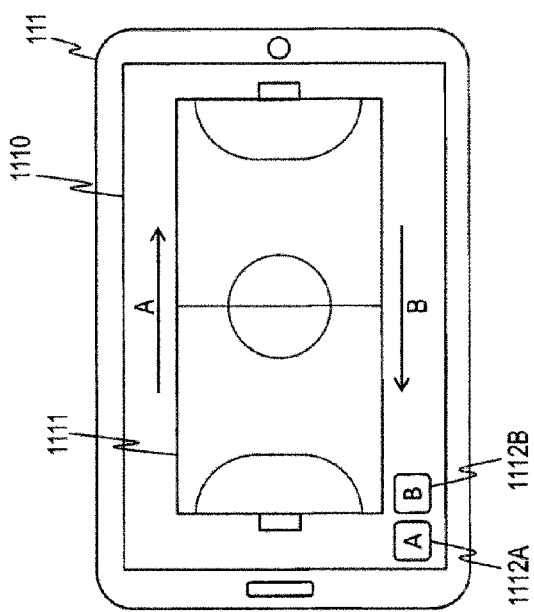
FIG. 4 is a view showing an example of a competition status input user interface 1110 provided in a competition status input unit 111.
Figure 5:
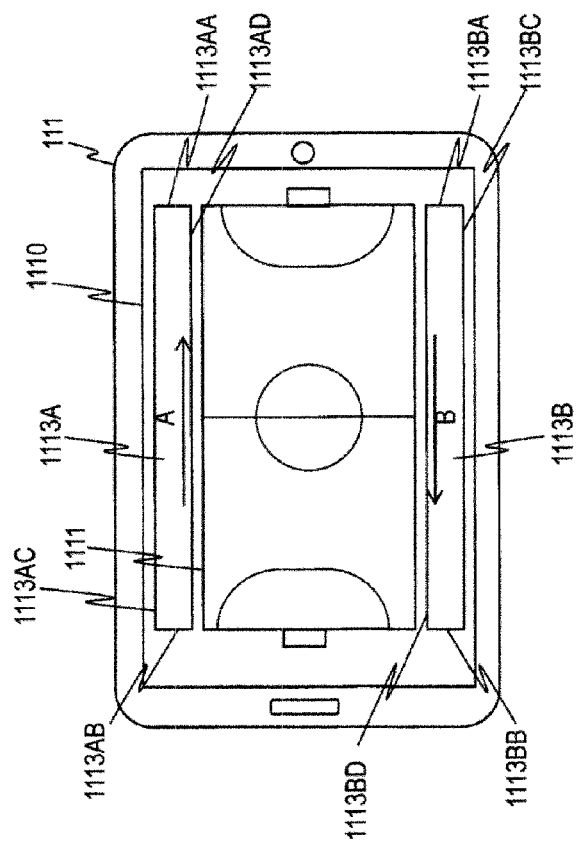
FIG. 5 is a view showing a different example to FIG. 4 of the competition status input user interface 1110 provided in the competition status input unit 111.

As shown in FIG. 3, the competition status acquisition unit 110 according to a first example includes a competition status input unit 111 and a competition status recognition unit 112. The competition status input unit 111 is a smartphone or a tablet terminal, for example, and includes a competition status input user interface 1110 that is displayed on a touch screen and receives touch input from an inputter. As shown in FIGS. 4 and 5, for example, the competition status input user interface 1110 includes a graphic 1111 (referred to hereafter as a "competition area graphic") imitating the competition area. The competition status input user interface 1110 receives input from the inputter relating to information indicating the team in possession of the ball and the location thereof within the competition area at each point during the sport competition.

As shown in FIG. 4, for example, the competition status input user interface 1110 may be provided with the competition area graphic 1111 and team selection buttons 1112A, 1112B corresponding respectively to the two teams. In this case, the competition status input unit 111 outputs, to the competition status recognition unit 112, the position in which a touch is detected on the competition area graphic 1111 as ball position information and the team for which a touch is detected on the team selection buttons 1112A, 1112B as information indicating the team in possession of the ball. In the example of FIG. 1, the inputter touches the position on the competition area graphic 1111 corresponding to the position of a ball 5 and touches the team selection button 1112B corresponding to team B, which is the team of the player $PB_5$. The competition status input unit 111 outputs, to the competition status recognition unit 112, the position of the ball 5, i.e., the position on the competition area graphic 1111 in which touch input was received, as the ball position information and team B, which corresponds to the team selection button 1112B for which a touch was detected, as the information indicating the team in possession of the ball.

In this case, the competition status recognition unit 112 outputs the information indicating the team in possession of the ball, among the input information, to the vibration information generation unit 120 as information indicating the team in possession of the ball. Further, the competition status recognition unit 112 acquires the distance to the goal 4B serving as the goal of team B from the ball position information, among the input information, and outputs the acquired distance to the vibration information generation unit 120 as information indicating the distance between the position of the ball and the goal of the team in possession of the ball. The distance may be the distance from the touched position of the ball 5 on the competition area graphic 1111 to the position of the goal 4B or a distance acquired by converting the distance on the competition area graphic 1111 into a distance on the actual pitch 1.

Alternatively, as shown in FIG. 5, for example, the competition status input user interface 1110 may be provided with the competition area graphic 1111 and team information input regions 1113A, 1113B corresponding respectively to the two teams. The team information input region 1113A is a region for receiving touch input and is disposed adjacent to a straight line of the competition area graphic 1111 corresponding to the touch line 3C. This region is a rectangular region constituted by a side 1113AA parallel to a straight line of the competition area graphic 1111 corresponding to the goal line 2A, a side 1113AB parallel to a straight line of the competition area graphic 1111 corresponding to the goal line 2B, and two sides 1113AC, 1113AD parallel to straight lines of the competition area graphic 1111 corresponding respectively to the touch lines 3C, 3D. The team information input region 1113B is a region for receiving touch input and is disposed adjacent to a straight line of the competition area graphic 1111 corresponding to the touch line 3D. This region is a rectangular region constituted by a side 1113BA parallel to the straight line of the competition area graphic 1111 corresponding to the goal line 2A, a side 1113BB parallel to the straight line of the competition area graphic 1111 corresponding to the goal line 2B, and two sides 1113BC, 1113BD parallel to the straight lines of the competition area graphic 1111 corresponding respectively to the touch lines 3C, 3D. In this case, the competition status input unit 111 sets the team corresponding to the region in which a touch is detected, among the team information input regions 1113A, 1113B, as the information indicating the team in possession of the ball. In addition, the competition status input unit 111 sets a position in which a touch is detected in the direction of the sides 1113AC, 1113AD of the team information input region 1113A or a position in which a touch is detected in the direction of the sides 1113BC, 1113BD of the team information input region 1113B as the ball position information. The competition status input unit 111 may then output the team information and the ball position information to the competition status recognition unit 112. In the example of FIG. 1, the inputter touches the team information input region 1113B corresponding to team B, which is the team of the player PB$_5$, in a position that corresponds to the position of the ball 5 in the direction of the sides 1113BC, 1113BD. The competition status input unit 111 then sets team B, which corresponds to the team information input region 1113B in which the touch is detected, as the information indicating the team in possession of the ball, sets the position in which the touch is detected in the direction of the sides 1113BC, 1113BD as the ball position information, and outputs the team information and the ball position information to the competition status recognition unit 112.

In this case, the competition status recognition unit 112 outputs the information indicating the team in possession of the ball, among the input information, to the vibration information generation unit 120 as information indicating the team in possession of the ball. Further, the competition status recognition unit 112 acquires the distance to the goal line 2B on which the goal 4B serving as the goal of team B is located from the ball position information, among the input information, and outputs the acquired distance to the vibration information generation unit 120 as information indicating the distance between the position of the ball and the goal of the team in possession of the ball. The distance may be the distance from the touched position in the direction of the sides 1113BC, 1113BD within the team information input region 1113B to the side 1113B or a distance acquired by converting this distance into a distance on the actual pitch 1.

Note that the team information input regions 1113A, 1113B may be determined in advance and do not have to be displayed explicitly. In the example of FIG. 5, however, the team information input regions 1113A, 1113B are clearly displayed using solid lines. Further, the team information input region 1113A may be set as a region that straddles the straight line of the competition area graphic 1111 corresponding to the touch line 3C, and the team information input region 1113B may be set as a region that straddles the straight line of the competition area graphic 1111 corresponding to the touch line 3C. Here, the team information input region 1113A and the team information input region 1113B should be arranged so as not to overlap. Needless to mention, the region set as the team information input region 1113A in FIG. 5 may be set as the team information input region 1113B, and the region set as the team information input region 1113B in FIG. 5 may be set as the team information input region 1113A.

The competition status input user interface 1110 of FIG. 5 is a user interface on which the inputter can easily perform input operations. The reason for this is that by holding the competition status input unit 111 constituted by a smartphone or a tablet terminal, for example, with both hands in a vertically oriented direction, the inputter can perform touch input on the team information input region 1113A with the thumb of one hand and perform touch input on the team information input region 1113B with the thumb of the other hand.

[[Second Example of Competition Status Acquisition Unit 110]]

Figure 6:
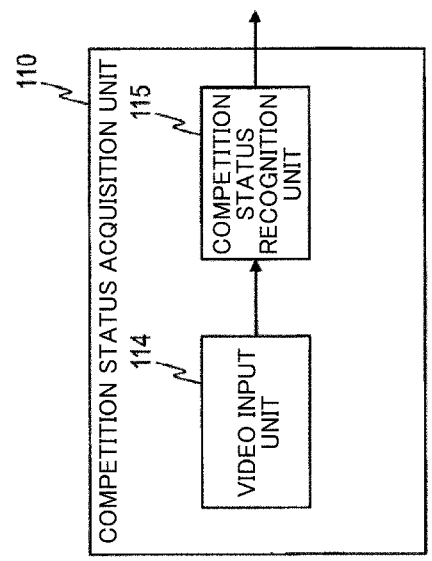
FIG. 6 is a view showing an example functional configuration of a second example of the competition status acquisition unit 110.

As shown in FIG. 6, the competition status acquisition unit 110 according to a second example includes a video input unit 114 and a competition status recognition unit 115.

The video input unit 114 is a video camera or a television camera, for example, and acquires video of the competition area and outputs the acquired video to the competition status recognition unit 115 in the form of a video signal. In the example of FIG. 1, the video input unit 114 acquires video of the pitch 1 and outputs the acquired video to the competition status recognition unit 115 in the form of a video signal.

The competition status recognition unit 115 applies a well-known object recognition technique to the video signal (the video of the competition area) input from the video input unit 114 in order to extract the ball, the team of the player nearest the ball, and the goal of the team of the player nearest the ball. The competition status recognition unit 115 then outputs information indicating the extracted team of the player nearest the ball to the vibration information generation unit 120 as information indicating the team in possession of the ball. Further, the competition status recognition unit 115 acquires information indicating the distance from the extracted position of the ball to the goal of the team of the player nearest the ball and outputs the acquired information to the vibration information generation unit 120 as information indicating the distance from the position of the ball to the goal of the team in possession of the ball. In the example of FIG. 1, the competition status recognition unit 115 performs the following three operations. Firstly, the competition status recognition unit 115 extracts the ball 5, team B, which is the team of the player PB$_5$ nearest the ball 5, and the goal 4B of team B. Secondly, the competition status recognition unit 115 outputs information indicating the extracted team B, i.e., the team of the player PB$_5$, to the vibration information generation unit 120 as the information indicating the team in possession of the ball. Thirdly, the competition status recognition unit 115 acquires information indicating the distance from the extracted position of the ball 5 to the goal 4B of team B and outputs the acquired information to the vibration information generation unit 120 as the information indicating the distance from the position of the ball to the goal of the team in possession of the ball.

[[Third Example of Competition Status Acquisition Unit 110]]

Figure 7:
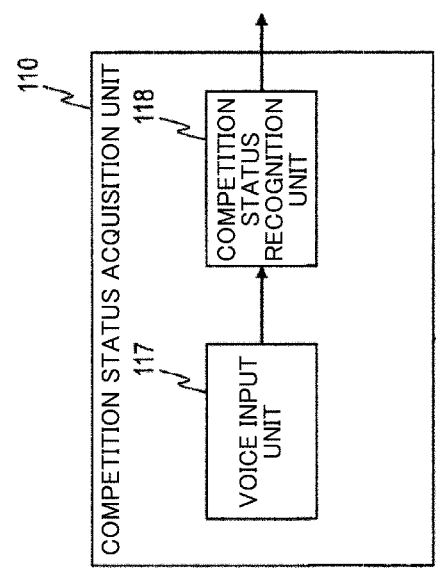
FIG. 7 is a view showing an example functional configuration of a third example of the competition status acquisition unit 110.

As shown in FIG. 7, the competition status acquisition unit 110 according to a third example includes a voice input unit 117 and a competition status recognition unit 118.

The voice input unit 117 is a microphone, for example, and acquires the voice of a commentator who comments on the status of the competition being held on the pitch 1 for a radio broadcast or the like, and outputs the acquired voice to the competition status recognition unit 118 in the form of a voice signal.

The competition status recognition unit 118 acquires information indicating the team in possession of the ball and information indicating the distance between the ball and the goal of the team in possession of the ball, and outputs the acquired information to the vibration information generation unit 120. Here, the competition status recognition unit 118 acquires the text of utterance content by applying a well-known voice recognition technique to the voice signal (the voice of the commentator) input from the voice input unit 117, and applies a well-known utterance comprehension technique to the text of the utterance content. In the applied well-known utterance comprehension technique, for example, correspondence relationships between the names of the players and the teams are determined and stored in advance as an utterance comprehension rule, and in so doing, the information indicating the team in possession of the ball can be acquired even when the text of the utterance content only includes a player name and not a team name. Further, the information indicating the distance between the ball and the goal of the team in possession of the ball does not have to be an exact numerical value. Instead, a rule according to which, for example, when the utterance content is " . . . has captured the ball near the opponent's goal", the distance is set as 35 meters, when the utterance content is " . . . has passed the halfway line", the distance is set as 20 meters, when the utterance content is " . . . has entered the penalty area", the distance is set as 6 meters, and so on may be determined in advance and stored as an utterance comprehension rule. In the case of the third example, the information cannot be acquired at such narrow time intervals as the first and second examples, but the most recently acquired information may be used as is until the next information is acquired. Furthermore, as regards the distance between the ball and the goal of the team in possession of the ball, a distance predicted by a well-known prediction technique using the most recently acquired information and information acquired prior thereto may be used. In the example of FIG. 1, the competition status recognition unit 118 outputs information indicating team B, which is the team of the player PB$_5$, to the vibration information generation unit 120 as the information indicating the team in possession of the ball from the utterance content "player PB$_5$ has entered the penalty area" uttered by the commentator, for example, and outputs 6 meters, which corresponds to " . . . has entered the penalty area", to the vibration information generation unit 120 as the information indicating the distance from the position of the ball to the goal of the team in possession of the ball.

[Vibration Information Generation Unit 120]

At each point of the sport competition, the vibration information generation unit 120 generates a vibration signal that increases as the distance from the ball to the goal of the team in possession of the ball decreases on the basis of the information indicating the distance from the ball to the goal of the team in possession of the ball, input from the competition status acquisition unit 110. The vibration information generation unit 120 then outputs the generated vibration signal to the vibration presentation unit 130 as a vibration signal of the channel of the team in possession of the ball, among a total of two channels, namely a left channel and a right channel allocated to the respective teams in advance. The vibration information generation unit 120 does not output a vibration signal to the channel of the team not in possession of the ball at each point of the sport competition. The frequency and waveform shape of the vibration signal may be set as desired, but to ensure that the vibration is easily perceived by the user, a 200 Hz sine wave, for example, may be used. The magnitude of the vibration signal may be set within a predetermined range, irrespective of the channel to which the signal is output. The relationship between the magnitude of the distance from the ball to the goal of the team in possession of the ball and the magnitude of the vibration signal may be linear or nonlinear, and may be determined in advance and stored in the vibration information generation unit 120. For example, when the relationship is nonlinear, the vibration information generation unit 120 may generate a vibration signal in which the degree of increase therein increases as the input distance from the ball to the goal of the team in possession of the ball increases. For example, when the status shown in FIG. 1 occurs in a case where the left channel has been allocated to team A and the right channel has been allocated to team B, the vibration information generation unit 120 outputs a vibration signal of a magnitude corresponding to 6 meters to the right channel. Then, when team B attacks even closer to the goal, the vibration information generation unit 120 outputs a larger vibration signal than the vibration signal (a vibration signal of the magnitude corresponding to 6 meters) of the status shown in FIG. 1 to the right channel. Conversely, when one of the players of team A captures the ball, the vibration information generation unit 120 outputs a smaller vibration signal (a vibration signal of the magnitude corresponding to 34 meters, for example) than the vibration signal (a vibration signal of the magnitude corresponding to 6 meters) of the status shown in FIG. 1 to the left channel.

[Vibration Presentation Unit 130]

The vibration presentation unit 130 is configured to include two vibrating bodies for respectively applying vibration to sites on the left side and the right side of the body of the user. The vibrating body for the site on the left side of the body generates vibration corresponding to the vibration signal of the left channel, input from the vibration information generation unit 120, and the vibrating body for the site on the right side of the body generates vibration corresponding to the vibration signal of the right channel, input from the vibration information generation unit 120. Thus, at each point during the sport competition, the vibrating body allocated to the team in possession of the ball vibrates by a larger amount as the distance between the ball and the goal of the team in possession of the ball decreases. The vibration generated by each vibrating body is transmitted to a site on the body of a user that contacts the vibrating body, and is perceived by the user as vibration. Hence, by sensing which of the left and right vibrating bodies is vibrating and the magnitude of the vibration, the user can perceive the status of the competition in terms of which team is attacking and by how much.

Figure 8:
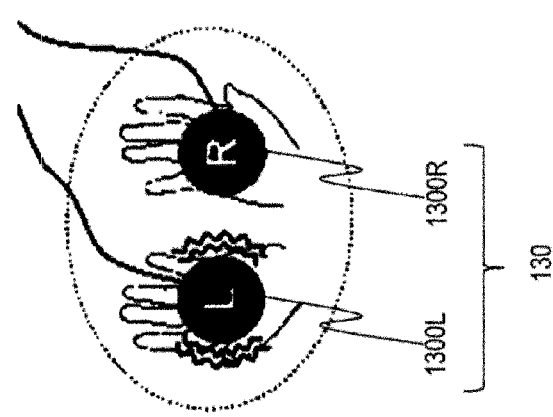
FIG. 8 is a view showing an example of a vibration presentation unit 130.

As shown in FIG. 8, examples of the two vibrating bodies included in the vibration presentation unit 130 are vibrating bodies 1300L, 1300R that are held respectively by the left and the right hand of the user. The vibrating bodies 1300L, 1300R may be formed to imitate the shape and unevenness of the ball of the subject competition. For example, in the case of five-a-side soccer for the visually impaired and soccer, the vibrating bodies 1300L, 1300R may be formed to imitate a typical soccer ball constituted by a sphere with pentagonal or hexagonal seams sewn therein. In the case of rugby, the vibrating bodies 1300L, 1300R may be formed to imitate an ellipsoidal rugby ball. The vibration generated by the vibrating bodies 1300L, 1300R is transmitted to the hands of the user holding the vibrating bodies and perceived by the user as vibration. Hence, by sensing which of the left and right vibrating bodies 1300L, 1300R held in the hands is vibrating and the magnitude of the vibration, the user can perceive the status of the competition in terms of which team is attacking and by how much.

The vibrating bodies included in the vibration presentation unit 130 may be attached to the backs of the hands or the wrists, or may be attached to the arms, i.e., sites on the upper limbs close to the trunk, or may be attached to the shoulders or the chest, i.e., sites even closer to the trunk, or may be attached to the legs or the like. Further, the vibration presentation unit 130 may be configured to include, in addition to the vibrating bodies, an auxiliary tool (a wristband, for example) such as a band for attaching the vibrating bodies to sites on the body. Note that as long as the vibrating bodies can at least be brought into contact with sites on the body of the user, it is not necessary for the user to be able to hold the vibrating bodies using sites on the body or for the vibrating bodies to be attachable to sites on the body of the user. Also note that although the two vibrating bodies are preferably brought into contact with/held by/attached to the same site on the left and right sides of the body of the user, the vibrating bodies do not necessarily have to be brought into contact with/held by/attached to the same site. In short, it is sufficient at least for the two vibrating bodies to be respectively brought into contact with/held by/attached to a site on the left side of the body of the user and a site on the right side of the body of the user so that the vibration is applied to the contact/holding/attachment sites.

Second Embodiment

Figure 9:
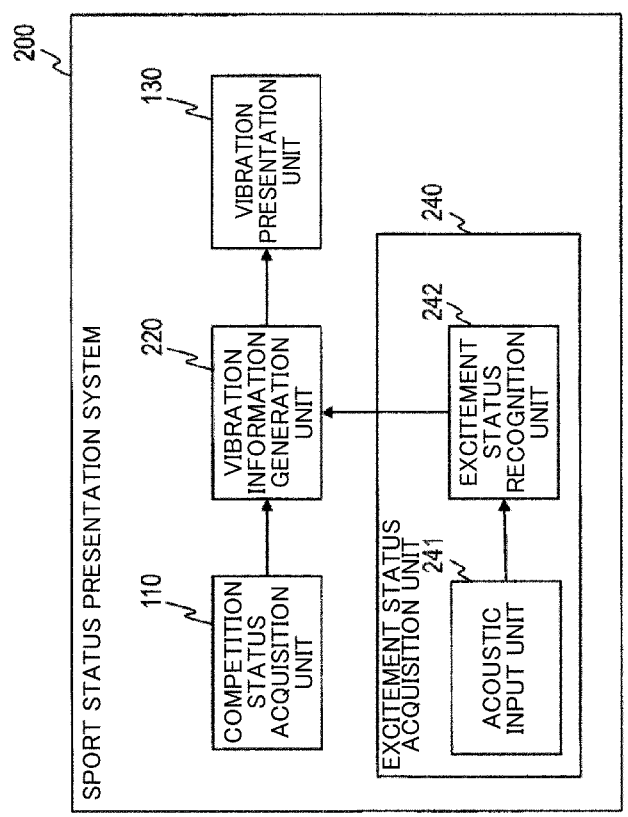
FIG. 9 is a view showing an example functional configuration of a sport status presentation system 200 according to a second embodiment.

The sport status presentation system may present vibration corresponding to the degree of excitement at the competition venue as well as the distance between the ball and the goal of the team in possession of the ball, as described in the first embodiment. This aspect will now be described as a second embodiment. A sport status presentation system according to the second embodiment includes two vibrating bodies, wherein the vibrating bodies respectively apply vibration to sites on the left side and the right side of the body of the user, and the competing teams are respectively allocated in advance to the vibrating bodies such that at each point during the subject sport competition, the vibrating body allocated to the team in possession of the ball is caused to vibrate by a greater amount as the distance between the ball and the goal of the team in possession of the ball decreases and by a greater amount as the degree of excitement at the competition venue increases. A functional configuration of a sport status presentation system 200 according to the second embodiment is as shown in the example in FIG. 9, and includes the competition status acquisition unit 110, an excitement status acquisition unit 240, a vibration information generation unit 220, and the vibration presentation unit 130.

[Competition Status Acquisition Unit 110]

The competition status acquisition unit 110 of the second embodiment, similarly to the competition status acquisition unit 110 of the first embodiment, acquires information indicating the team in possession of the ball and information indicating the distance between the ball and the goal of the team in possession of the ball at each point during the sport competition, and outputs the acquired information to the vibration information generation unit 220.

[Excitement Status Acquisition Unit 240]

The excitement status acquisition unit 240 acquires information expressing the degree of excitement at the competition venue where the sport competition is underway at each point during the sport competition, and outputs the acquired information to the vibration information generation unit 220. The excitement status acquisition unit 240 includes an acoustic input unit 241 and an excitement status recognition unit 242. The acoustic input unit 241 is a microphone oriented toward the spectator seats of the competition venue, for example, and acquires sound generated by the spectator seats of the competition venue and outputs the acquired sound to the excitement status recognition unit 242 in the form of an acoustic signal. The excitement status recognition unit 242 acquires information indicating the magnitude of the acoustic signal input from the acoustic input unit 241 and outputs the acquired information indicating the magnitude of the acoustic signal to the vibration information generation unit 220 as information expressing the degree of excitement. For example, the information expressing the degree of excitement at the competition venue is a value E acquired by normalizing a value representing the magnitude of the input acoustic signal so that a maximum value and a minimum value of the values that can be taken by the value representing the magnitude of the acoustic signal are 1 and 0, respectively.

[Vibration Information Generation Unit 220]

The vibration information generation unit 220 generates a vibration signal that increases as the distance from the ball to the goal of the team in possession of the ball decreases and increases as the degree of excitement at the competition venue increases, and outputs the generated vibration signal to the vibration presentation unit 130 as a vibration signal of the channel of the team in possession of the ball, among a total of two channels, namely a left channel and a right channel allocated to the respective teams in advance. Here, the vibration information generation unit 220 generates the aforesaid vibration signal at each point of the sport competition on the basis of the information indicating the distance from the ball to the goal of the team in possession of the ball, input from the competition status acquisition unit 110, and the information expressing the degree of excitement at the competition venue, input from the excitement status acquisition unit 240. The vibration information generation unit 220 does not output a vibration signal to the channel of the team not in possession of the ball at each point of the sport competition. For example, assuming that a distance L from the ball to the goal of the team in possession of the ball and a magnitude $S_1$ of the vibration signal have a relationship of $S_1=f(L)$ in the vibration information generation unit 120 according to the first embodiment, the vibration information generation unit 220 acquires and outputs a vibration signal with a magnitude $S_2$, which is determined from $S_2=f(L)\times(1+\alpha E)$ on the basis of the distance L from the ball to the goal of the team in possession of the ball and the information E expressing the degree of excitement at the competition venue, for example. Note that $\alpha$ is a predetermined value larger than 0 and smaller than 1.

[Vibration Presentation Unit 130]

The vibration presentation unit 130, similarly to the vibration presentation unit 130 of the first embodiment, is configured to include two vibrating bodies for respectively applying vibration to sites on the left side and the right side of the body of the user. In the vibration presentation unit 130, the vibrating body for the site on the left side of the body generates vibration corresponding to the vibration signal of the left channel, input from the vibration information generation unit 220, and the vibrating body for the site on the right side of the body generates vibration corresponding to the vibration signal of the right channel, input from the vibration information generation unit 220. Thus, at each point during the sport competition, the vibrating body allocated to the team in possession of the ball vibrates by a larger amount as the distance between the ball and the goal of the team in possession of the ball decreases and by a larger amount as the degree of excitement at the competition venue increases.

During an actual competition, even when a team attacks to the same position, the likelihood of scoring a point differs according to the status. Here, the status includes the status of the attack being conducted by the team in possession of the ball, such as whether or not the player in possession of the ball is a player with superior athletic ability and whether or not a player is available to receive a pass during the attack, the status of the defense being conducted by the team not in possession of the ball, such as whether or not there is a defensive player near the player in possession of the ball, near the player who is to receive the pass, or near the goal, and so on. The spectators at the competition venue make an overall judgment as to the status of the attack and the status of the defense and generate sound such as cheering in a steadily greater amount as the likelihood of a point being scored increases. With the sport status presentation system 200 according to the second embodiment, by tactually presenting vibration based on the magnitude of the sound generated by the spectators at the competition venue, the user can perceive the status of the competition, in terms of which team is attacking and by how much, more accurately.

Third Embodiment

Figure 10:
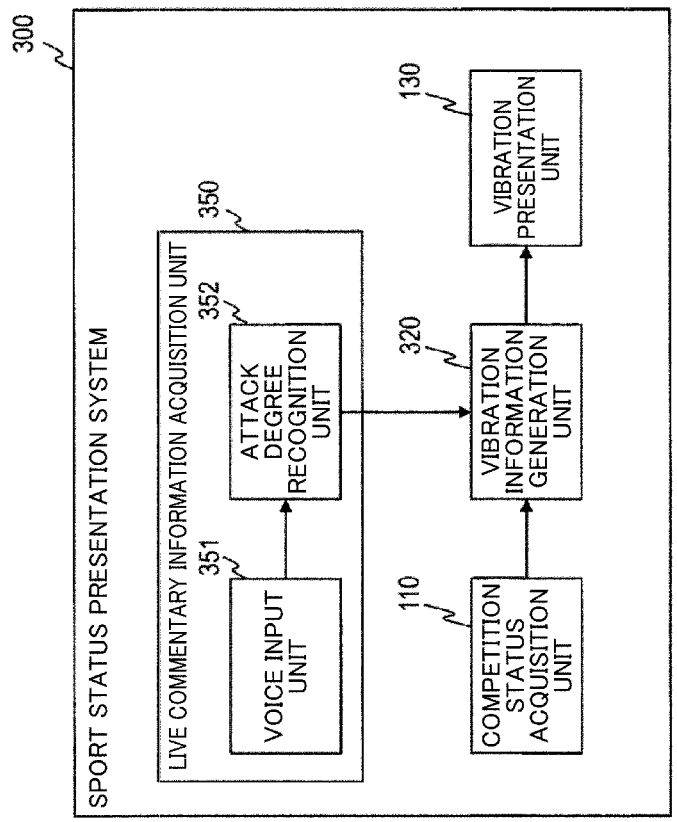
FIG. 10 is a view showing an example functional configuration of a sport status presentation system 300 according to a third embodiment.

The sport status presentation system may present vibration corresponding to the status of the competition as described by a commentator as well as the distance between the ball and the goal of the team in possession of the ball, as described in the first embodiment. This aspect will now be described as a third embodiment. A sport status presentation system according to the third embodiment includes two vibrating bodies, wherein the vibrating bodies respectively apply vibration to sites on the left side and the right side of the body of the user. Further, in the sport status presentation system according to the third embodiment, the competing teams are respectively allocated in advance to the vibrating bodies such that at each point during the subject sport competition, the vibrating body allocated to the team in possession of the ball is caused to vibrate by a greater amount as the distance between the ball and the goal of the team in possession of the ball decreases and by a greater amount as the status of the competition as described by a commentator corresponds to increases in the degree of an attack being conducted by the team in possession of the ball. A functional configuration of a sport status presentation system 300 according to the third embodiment is as shown in the example in FIG. 10, and includes the competition status acquisition unit 110, alive commentary information acquisition unit 350, a vibration information generation unit 320, and the vibration presentation unit 130.

[Competition Status Acquisition Unit 110]

The competition status acquisition unit 110 of the third embodiment, similarly to the competition status acquisition unit 110 of the first embodiment and the second embodiment, acquires information indicating the team in possession of the ball and information indicating the distance between the ball and the goal of the team in possession of the ball at each point during the sport competition, and outputs the acquired information to the vibration information generation unit 320.

[Live Commentary Information Acquisition Unit 350]

The live commentary information acquisition unit 350 acquires information representing the degree of the attack being conducted by the team in possession of the ball from the status of the competition as described by a commentator at each point of the sport competition, and outputs the acquired information to the vibration information generation unit 320. The live commentary information acquisition unit 350 includes a voice input unit 351 and an attack degree recognition unit 352.

The voice input unit 351 is a microphone, for example, which acquires the voice of a commentator commenting on the status of the competition being held in the competition area for a radio broadcast or the like, and outputs a voice signal to the attack degree recognition unit 352. When the competition status acquisition unit 110 includes the voice input unit 117, as in the third example described in the first embodiment, the same microphone may be used as the voice input unit 117 and the voice input unit 351.

The attack degree recognition unit 352 acquires the text of utterance content by applying a well-known voice recognition technique to the voice signal (the voice of the commentator) input from the voice input unit 351, acquires information expressing the degree of the attack being conducted by the team in possession of the ball by applying a well-known utterance comprehension technique to the text of the utterance content, and outputs the acquired information to the vibration information generation unit 320. The information expressing the degree of the attack is a value G, for example, which is a value no smaller than 0 and no greater than 1 and a value that increases as the degree of the attack increases. For example, a relationship between the utterance content and the information G expressing the degree of the attack may be determined in advance and stored such that when the utterance content is " . . . is one on one with the keeper", G=1, when the utterance content is " . . . is surrounded by players", G=0, and so on. Note that although the information expressing the degree of the attack cannot be acquired at narrow time intervals, the most recently acquired information may be used as is until the next information is acquired, information predicted by a well-known prediction technique using the most recently acquired information and information acquired prior thereto may be used, or information having a magnitude that attenuates such that the value thereof reaches 0 upon the elapse of a predetermined time following acquisition of the information may be used.

[Vibration Information Generation Unit 320]

The vibration information generation unit 320 generates a vibration signal that increases as the distance from the ball to the goal of the team in possession of the ball decreases and increases as the status of the competition as described by the commentator corresponds to increases in the degree of the attack being conducted by the team in possession of the ball, and outputs the generated vibration signal to the vibration presentation unit 130 as a vibration signal of the channel of the team in possession of the ball, among a total of two channels, namely a left channel and a right channel allocated to the respective teams in advance. Here, the vibration information generation unit 320 generates the aforesaid vibration signal at each point of the sport competition on the basis of the information indicating the distance from the ball to the goal of the team in possession of the ball, input from the competition status acquisition unit 110, and the information expressing the degree of the attack, input from the live commentary information acquisition unit 350. The vibration information generation unit 320 does not output a vibration signal to the channel of the team not in possession of the ball at each point of the sport competition. For example, the vibration information generation unit 320 acquires and outputs a vibration signal with a magnitude $S_3$, which is determined from $S_3=f(L)\times(1+\beta G)$ on the basis of the distance L from the ball to the goal of the team in possession of the ball and the information G expressing the degree of the attack. Note that $\beta$ is a predetermined value larger than 0 and smaller than 1.

[Vibration Presentation Unit 130]

The vibration presentation unit 130, similarly to the vibration presentation unit 130 of the first embodiment and the second embodiment, is configured to include two vibrating bodies for respectively applying vibration to sites on the left side and the right side of the body of the user. In the vibration presentation unit 130, the vibrating body for the site on the left side of the body generates vibration corresponding to the vibration signal of the left channel, input from the vibration information generation unit 320, and the vibrating body for the site on the right side of the body generates vibration corresponding to the vibration signal of the right channel, input from the vibration information generation unit 320. Thus, at each point during the sport competition, the vibrating body allocated to the team in possession of the ball vibrates by a larger amount as the distance between the ball and the goal of the team in possession of the ball decreases and by a larger amount as the status of the competition as described by the commentator corresponds to increases in the degree of the attack being conducted by the team in possession of the ball.

As also described in the second embodiment, during an actual competition, even when a team attacks to the same position, the likelihood of scoring a point differs according to the status of the attack and the status of the defense. The commentator comments on the status of the competition using concise expressions acquired by analyzing the status of the attack and the status of the defense on the basis of specialist knowledge and experience. With the sport status presentation system 300 according to the third embodiment, by presenting vibration that is also based on the status of the competition as described by the commentator, the user can tactually sense the status of the competition, in terms of which team is attacking and by how much, more accurately.

Modified Example 1 of Third Embodiment

Figure 11:
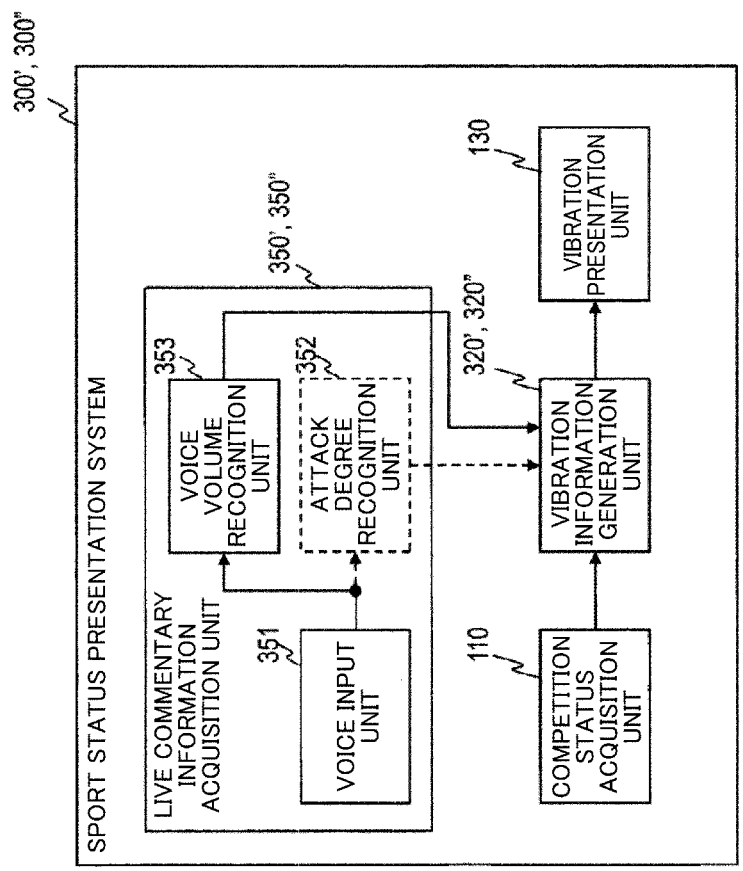
FIG. 11 is a view showing example functional configurations of sport status presentation systems 300', 300" according to modified examples 1 and 2 of the third embodiment.

Vibration corresponding to the loudness of the voice of the commentator as well as the distance between the ball and the goal of the team in possession of the ball and the status of the competition as described by the commentator may also be presented. This aspect will now be described as modified example 1 of the third embodiment. A sport status presentation system according to modified example 1 of the third embodiment includes two vibrating bodies, wherein the vibrating bodies respectively apply vibration to sites on the left side and the right side of the body of the user. Further, in this sport status presentation system, the competing teams are respectively allocated in advance to the vibrating bodies such that at each point during the subject sport competition, the vibrating body allocated to the team in possession of the ball is caused to vibrate by a greater amount as the distance between the ball and the goal of the team in possession of the ball decreases, by a greater amount as the status of the competition as described by the commentator corresponds to increases in the degree of the attack being conducted by the team in possession of the ball, and by a greater amount as the loudness of the voice of the commentator increases. A functional configuration of a sport status presentation system 300' according to modified example 1 of the third embodiment is as shown in the example in FIG. 11, and includes the competition status acquisition unit 110, a live commentary information acquisition unit 350', a vibration information generation unit 320', and the vibration presentation unit 130. With regard to modified example 1 of the third embodiment, identical points to the third embodiment will be described below with reference to the third embodiment.

[Competition Status Acquisition Unit 110]

The competition status acquisition unit 110 is identical to the competition status acquisition unit 110 of the third embodiment except that the output destination of the information is the vibration information generation unit 320'.

[Live Commentary Information Acquisition Unit 350']

At each point during the sport competition, the live commentary information acquisition unit 350' acquires information expressing the degree of the attack being conducted by the team in possession of the ball from the status of the competition as described by the commentator, also acquires information indicating the loudness of the voice of the commentator, and outputs the acquired information to the vibration information generation unit 320'. The live commentary information acquisition unit 350' includes the voice input unit 351, the attack degree recognition unit 352, and a voice volume recognition unit 353. The voice input unit 351 is identical to the voice input unit 351 of the third embodiment except that the voice signal acquired thereby is also output to the voice volume recognition unit 353. The voice volume recognition unit 353 acquires information expressing the magnitude of the voice signal input from the voice input unit 351 and outputs the acquired information expressing the magnitude of the voice signal to the vibration information generation unit 320' as information expressing the loudness of the voice of the commentator. For example, the information expressing the loudness of the voice of the commentator is a value H acquired by normalizing a value representing the magnitude of the input voice signal so that a maximum value and a minimum value of the values that can be taken by the value representing the magnitude of the voice signal are 1 and 0, respectively. The attack degree recognition unit 352 is identical to the attack degree recognition unit 352 of the third embodiment except that the output destination of the information is the vibration information generation unit 320'.

[Vibration Information Generation Unit 320']

The vibration information generation unit 320' generates a vibration signal that increases as the distance from the ball to the goal of the team in possession of the ball decreases, increases as the status of the competition as described by the commentator corresponds to increases in the degree of the attack being conducted by the team in possession of the ball, and increases as the loudness of the voice of the commentator increases, and outputs the generated vibration signal to the vibration presentation unit 130 as a vibration signal of the channel of the team in possession of the ball, among a total of two channels, namely a left channel and a right channel allocated to the respective teams in advance. Here, the vibration information generation unit 320' generates the aforesaid vibration signal at each point of the sport competition on the basis of the information indicating the distance from the ball to the goal of the team in possession of the ball, input from the competition status acquisition unit 110, and the information expressing the degree of the attack and the information expressing the loudness of the voice of the commentator, input from the live commentary information acquisition unit 350'. The vibration information generation unit 320' does not output a vibration signal to the channel of the team not in possession of the ball at each point of the sport competition. For example, the vibration information generation unit 320' acquires and outputs a vibration signal with a magnitude $S_4$, which is determined from $S_4=f(L)\times(1+\beta G+\gamma H)$ on the basis of the distance L from the ball to the goal of the team in possession of the ball, the information G expressing the degree of the attack, and the information H expressing the loudness of the voice of the commentator. Note that γ is a predetermined value larger than 0 and smaller than 1.

[Vibration Presentation Unit 130]

The vibration presentation unit 130 is identical to the vibration presentation unit 130 of the third embodiment except that the vibration signal is input therein from the vibration information generation unit 320'. In other words, at each point during the sport competition, the vibrating body allocated to the team in possession of the ball vibrates by a larger amount as the distance between the ball and the goal of the team in possession of the ball decreases, by a greater amount as the status of the competition as described by the commentator corresponds to increases in the degree of the attack being conducted by the team in possession of the ball, and by a greater amount as the loudness of the voice of the commentator increases.

The commentator describes the likelihood of a point being scored, which is based on the status of the attack and the status of the defense, also using the loudness of his/her voice. With the sport status presentation system 300' according to modified example 1 of the third embodiment, by presenting vibration that is based on the status of the competition as described by the commentator and also the loudness of the voice of the commentator, the user can tactually sense the status of the competition, in terms of which team is attacking and by how much, more accurately.

Modified Example 2 of Third Embodiment

When vibration that also corresponds to the loudness of the voice of the commentator is presented, as in modified example 1 of the third embodiment, vibration that is not based on the status of the competition as described by the commentator may be presented. This aspect will now be described as modified example 2 of the third embodiment. A sport status presentation system according to modified example 2 of the third embodiment includes two vibrating bodies, wherein the vibrating bodies respectively apply vibration to sites on the left side and the right side of the body of the user, and the competing teams are respectively allocated in advance to the vibrating bodies such that at each point during the subject sport competition, the vibrating body allocated to the team in possession of the ball is caused to vibrate by a greater amount as the distance between the ball and the goal of the team in possession of the ball decreases and by a greater amount as the loudness of the voice of the commentator increases. A functional configuration of a sport status presentation system 300" according to modified example 2 of the third embodiment is as shown in the example in FIG. 11, and includes the competition status acquisition unit 110, a live commentary information acquisition unit 350", a vibration information generation unit 320", and the vibration presentation unit 130. With regard to modified example 2 of the third embodiment, identical points to modified example 1 of the third embodiment will be described below with reference to modified example 1 of the third embodiment.

[Competition Status Acquisition Unit 110]

The competition status acquisition unit 110 according to modified example 2 of the third embodiment is identical to the competition status acquisition unit 110 according to modified example 1 of the third embodiment except that the output destination of the information is the vibration information generation unit 320".

[Live Commentary Information Acquisition Unit 350"]

At each point during the sport competition, the live commentary information acquisition unit 350" acquires information indicating the loudness of the voice of the commentator and outputs the acquired information to the vibration information generation unit 320". The live commentary information acquisition unit 350" includes the voice input unit 351 and the voice volume recognition unit 353 but does not include a part indicated by dotted lines in FIG. 11. The voice input unit 351 is identical to the voice input unit 351 according to modified example 1 of the third embodiment except that the acquired voice of the commentator is output only to the voice volume recognition unit 353. The voice volume recognition unit 353 is identical to the voice volume recognition unit 353 according to modified example 1 of the third embodiment except that the output destination of the information is the vibration information generation unit 320".

[Vibration Information Generation Unit 320"]

The vibration information generation unit 320" generates a vibration signal that increases as the distance from the ball to the goal of the team in possession of the ball decreases and increases as the loudness of the voice of the commentator increases, and outputs the generated vibration signal to the vibration presentation unit 130 as a vibration signal of the channel of the team in possession of the ball, among a total of two channels, namely a left channel and a right channel allocated to the respective teams in advance. Here, the vibration information generation unit 320" generates the aforesaid vibration signal at each point of the sport competition on the basis of the information indicating the distance from the ball to the goal of the team in possession of the ball, input from the competition status acquisition unit 110, and the information expressing the loudness of the voice of the commentator, input from the live commentary information acquisition unit 350". The vibration information generation unit 320" does not output a vibration signal to the channel of the team not in possession of the ball at each point of the sport competition. For example, the vibration information generation unit 320" acquires and outputs a vibration signal with a magnitude $S_5$, which is determined from $S_5=f(L)\times(1+\gamma H)$ on the basis of the distance L from the ball to the goal of the team in possession of the ball and the information H expressing the loudness of the voice of the commentator.

[Vibration Presentation Unit 130]

The vibration presentation unit 130 is identical to the vibration presentation unit 130 according to modified example 1 of the third embodiment except that the vibration signal is input therein from the vibration information generation unit 320". In other words, at each point during the sport competition, the vibrating body allocated to the team in possession of the ball vibrates by a larger amount as the distance between the ball and the goal of the team in possession of the ball decreases and by a greater amount as the loudness of the voice of the commentator increases.

Fourth Embodiment

Figure 12:
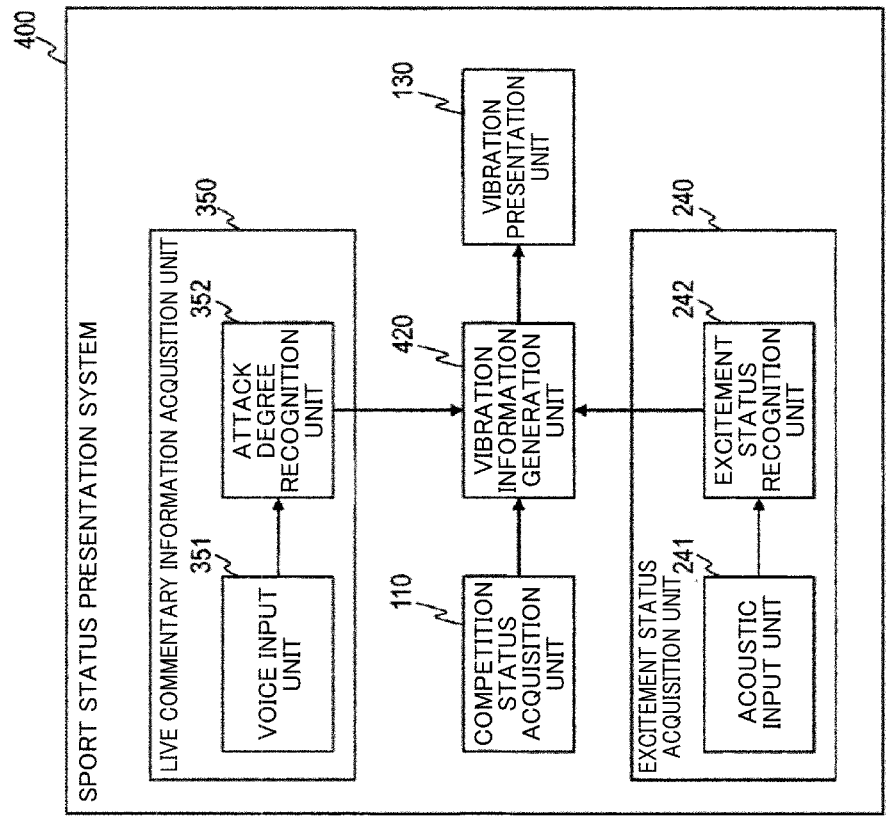
FIG. 12 is a view showing an example functional configuration of a sport status presentation system 400 according to a fourth embodiment.

Vibration corresponding to the degree of excitement at the competition venue and the status of the competition as described by the commentator as well as the distance between the ball and the goal of the team in possession of the ball, as described in the first embodiment, may also be presented. This aspect will now be described as a fourth embodiment. A sport status presentation system according to the fourth embodiment includes two vibrating bodies, wherein the vibrating bodies respectively apply vibration to sites on the left side and the right side of the body of the user. Further, in the sport status presentation system according to the fourth embodiment, the competing teams are respectively allocated in advance to the vibrating bodies such that at each point during the subject sport competition, the vibrating body allocated to the team in possession of the ball is caused to vibrate by a greater amount as the distance between the ball and the goal of the team in possession of the ball decreases, by a greater amount as the degree of excitement at the competition venue increases, and by a greater amount as the status of the competition as described by a commentator corresponds to increases in the degree of the attack being conducted by the team in possession of the ball. A functional configuration of a sport status presentation system 400 according to the fourth embodiment is as shown in the example in FIG. 12, and includes the competition status acquisition unit 110, the excitement status acquisition unit 240, the live commentary information acquisition unit 350, a vibration information generation unit 420, and the vibration presentation unit 130.

[Competition Status Acquisition Unit 110]

The competition status acquisition unit 110, similarly to the competition status acquisition unit 110 of the first to third embodiments, acquires information indicating the team in possession of the ball and information indicating the distance between the ball and the goal of the team in possession of the ball at each point during the sport competition, and outputs the acquired information to the vibration information generation unit 420.

[Excitement Status Acquisition Unit 240]

The excitement status acquisition unit 240, similarly to the excitement status acquisition unit 240 of the second embodiment, acquires information expressing the degree of excitement at the competition venue where the pitch 1 is located at each point during the sport competition, and outputs the acquired information to the vibration information generation unit 420.

[Live Commentary Information Acquisition Unit 350]

The live commentary information acquisition unit 350, similarly to the live commentary information acquisition unit 350 of the third embodiment, acquires information expressing the degree of the attack from the status of the competition as described by the commentator at each point of the sport competition, and outputs the acquired information to the vibration information generation unit 420.

[Vibration Information Generation Unit 420]

The vibration information generation unit 420 generates a vibration signal that increases as the distance from the ball to the goal of the team in possession of the ball decreases, increases as the degree of excitement at the competition venue increases, and increases as the status of the competition as described by the commentator corresponds to increases in the degree of the attack being conducted by the team in possession of the ball, and outputs the generated vibration signal to the vibration presentation unit 130 as a vibration signal of the channel of the team in possession of the ball, among a total of two channels, namely a left channel and a right channel allocated to the respective teams in advance. Here, the vibration information generation unit 420 generates the aforesaid vibration signal at each point of the sport competition on the basis of the information indicating the distance from the ball to the goal of the team in possession of the ball, input from the competition status acquisition unit 110, the information expressing the degree of excitement at the competition venue, input from the excitement status acquisition unit 240, and the information expressing the degree of the attack, input from the live commentary information acquisition unit 350. The vibration information generation unit 420 does not output a vibration signal to the channel of the team not in possession of the ball at each point of the sport competition. For example, the vibration information generation unit 420 acquires and outputs a vibration signal with a magnitude $S_6$, which is determined from $S_6=f(L)\times(1+\alpha E+\beta G)$ on the basis of the distance L from the ball to the goal of the team in possession of the ball, the information E expressing the degree of excitement at the competition venue, and the information G expressing the degree of the attack.

[Vibration Presentation Unit 130]

The vibration presentation unit 130, similarly to the vibration presentation unit 130 of the first to third embodiments, is configured to include two vibrating bodies for respectively applying vibration to sites on the left side and the right side of the body of the user. In the vibration presentation unit 130, the vibrating body for the site on the left side of the body generates vibration corresponding to the vibration signal of the left channel, input from the vibration information generation unit 420, and the vibrating body for the site on the right side of the body generates vibration corresponding to the vibration signal of the right channel, input from the vibration information generation unit 420. Thus, at each point during the sport competition, the vibrating body allocated to the team in possession of the ball vibrates by a larger amount as the distance between the ball and the goal of the team in possession of the ball decreases, by a larger amount as the degree of excitement at the competition venue increases, and by a larger amount as the status of the competition as described by a commentator corresponds to increases in the degree of the attack being conducted by the team in possession of the ball.

Modified Example 1 of Fourth Embodiment

Figure 13:
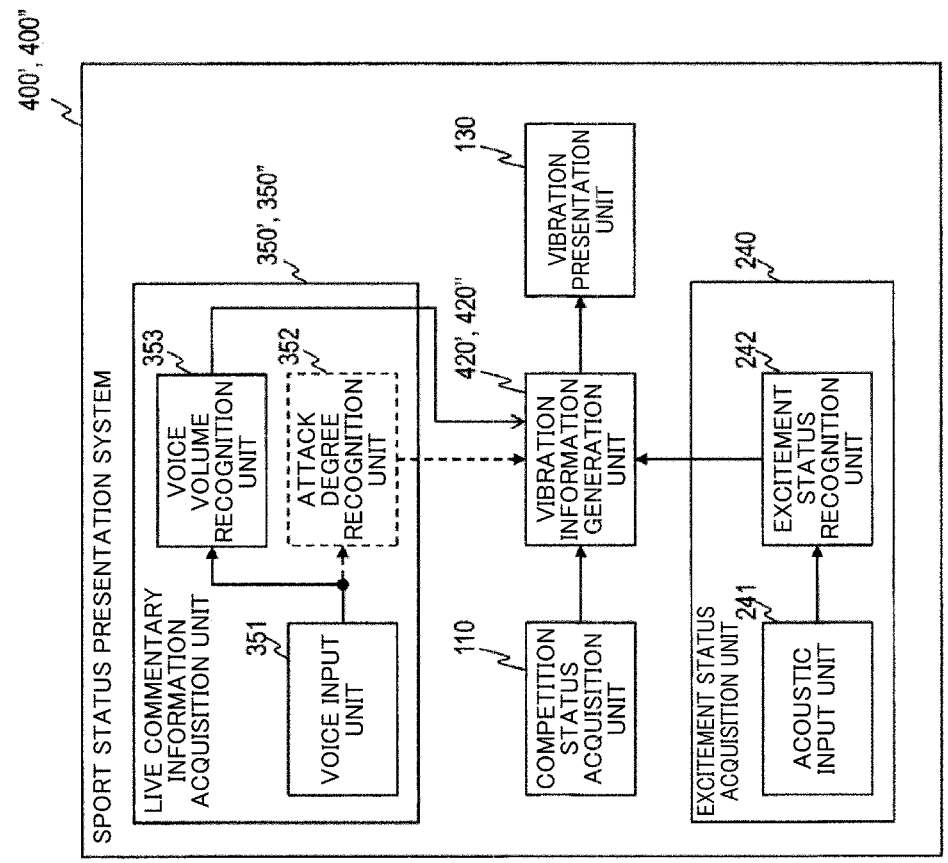
FIG. 13 is a view showing example functional configurations of sport status presentation systems 400', 400" according to modified examples of the fourth embodiment.

The fourth embodiment may be modified in a similar manner to modified example 1 of the third embodiment. More specifically, a sport status presentation system according to modified example 1 of the fourth embodiment includes two vibrating bodies, wherein the vibrating bodies respectively apply vibration to sites on the left side and the right side of the body of the user. Further, in this sport status presentation system, the competing teams are respectively allocated in advance to the vibrating bodies such that at each point during the subject sport competition, the vibrating body allocated to the team in possession of the ball is caused to vibrate by a greater amount as the distance between the ball and the goal of the team in possession of the ball decreases, by a greater amount as the degree of excitement at the competition venue increases, by a greater amount as the status of the competition as described by the commentator corresponds to increases in the degree of the attack being conducted by the team in possession of the ball, and by a greater amount as the loudness of the voice of the commentator increases. A functional configuration of a sport status presentation system 400' according to modified example 1 of the fourth embodiment is as shown in the example in FIG. 13, and includes the competition status acquisition unit 110, the excitement status acquisition unit 240, the live commentary information acquisition unit 350', a vibration information generation unit 420', and the vibration presentation unit 130. Operations except those performed by the vibration information generation unit 420' are similar to modified example 1 of the third embodiment or the fourth embodiment, and therefore the operations of the vibration information generation unit 420' will be described below.

[Vibration Information Generation Unit 420']

The vibration information generation unit 420' generates a vibration signal that increases as the distance from the ball to the goal of the team in possession of the ball decreases, increases as the degree of excitement at the competition venue increases, increases as the status of the competition as described by the commentator corresponds to increases in the degree of the attack being conducted by the team in possession of the ball, and increases as the loudness of the voice of the commentator increases, and outputs the generated vibration signal to the vibration presentation unit 130 as a vibration signal of the channel of the team in possession of the ball, among a total of two channels, namely a left channel and a right channel allocated to the respective teams in advance. Here, the vibration information generation unit 420' generates the aforesaid vibration signal at each point of the sport competition on the basis of the information indicating the distance from the ball to the goal of the team in possession of the ball, input from the competition status acquisition unit 110, the information expressing the degree of excitement at the competition venue, input from the excitement status acquisition unit 240, and the information expressing the degree of the attack and the information expressing the loudness of the voice of the commentator, input from the live commentary information acquisition unit 350'. The vibration information generation unit 420' does not output a vibration signal to the channel of the team not in possession of the ball at each point of the sport competition. For example, the vibration information generation unit 420' acquires and outputs a vibration signal with a magnitude $S_7$, which is determined from $S_7=f(L)\times(1+\alpha E+\beta G+\gamma H)$ on the basis of the distance L from the ball to the goal of the team in possession of the ball, the information E expressing the degree of excitement at the competition venue, the information G expressing the degree of the attack, and the information H expressing the loudness of the voice of the commentator.

Modified Example 2 of Fourth Embodiment

The fourth embodiment may also be modified in a similar manner to modified example 2 of the third embodiment. More specifically, a sport status presentation system according to modified example 2 of the fourth embodiment includes two vibrating bodies, wherein the vibrating bodies respectively apply vibration to sites on the left side and the right side of the body of the user. Further, in this sport status presentation system, the competing teams are respectively allocated in advance to the vibrating bodies such that at each point during the subject sport competition, the vibrating body allocated to the team in possession of the ball is caused to vibrate by a greater amount as the distance between the ball and the goal of the team in possession of the ball decreases, by a greater amount as the degree of excitement at the competition venue increases, and by a greater amount as the loudness of the voice of the commentator increases. A functional configuration of a sport status presentation system 400" according to modified example 2 of the fourth embodiment is as shown in the example in FIG. 13, and includes the competition status acquisition unit 110, the excitement status acquisition unit 240, the live commentary information acquisition unit 350", a vibration information generation unit 420", and the vibration presentation unit 130. Operations except those performed by the vibration information generation unit 420" are similar to modified example 2 of the third embodiment or the fourth embodiment, and therefore the operations of the vibration information generation unit 420" will be described below.

[Vibration Information Generation Unit 420"]

The vibration information generation unit 420" generates a vibration signal that increases as the distance from the ball to the goal of the team in possession of the ball decreases, increases as the degree of excitement at the competition venue increases, and increases as the loudness of the voice of the commentator increases, and outputs the generated vibration signal to the vibration presentation unit 130 as a vibration signal of the channel of the team in possession of the ball, among a total of two channels, namely a left channel and a right channel allocated to the respective teams in advance. Here, the vibration information generation unit 420" generates the aforesaid vibration signal at each point of the sport competition on the basis of the information indicating the distance from the ball to the goal of the team in possession of the ball, input from the competition status acquisition unit 110, the information expressing the degree of excitement at the competition venue, input from the excitement status acquisition unit 240, and the information expressing the loudness of the voice of the commentator, input from the live commentary information acquisition unit 350". The vibration information generation unit 420" does not output a vibration signal to the channel of the team not in possession of the ball at each point of the sport competition. For example, the vibration information generation unit 420" acquires and outputs a vibration signal with a magnitude $S_8$, which is determined from $S_8=f(L)\times(1+\alpha E+\gamma H)$ on the basis of the distance L from the ball to the goal of the team in possession of the ball, the information E expressing the degree of excitement at the competition venue, and the information H expressing the loudness of the voice of the commentator.

Other Embodiments

[Wireless Transmission]

In the sport status presentation systems 100, 200, 300, 300', 300", 400, 400', 400" according to the embodiments and modified examples, the respective units may be connected via zones in which information is transmitted wirelessly. For example, by sharing the voice input unit 117 of the competition status acquisition unit 110 and/or the voice input unit 351 of the live commentary information acquisition unit 350, 350', 350" with a radio broadcasting microphone, FM broadcasting or the like may be used to transmit information between the voice input unit 117 and the competition status recognition unit 118 and/or between the voice input unit 351 and the attack degree recognition unit 352. In another example, FM broadcasting, WiFi (registered trademark), a portable telephone line, or the like may be used to transmit information between the competition status acquisition unit 110, including the competition status input unit 111 and the competition status recognition unit 112, and the vibration information generation unit 120, 220, 320, 320', 320", 420, 420', 420".

[Combined Use with Live Commentary by Radio or the Like]

A sighted person may use the sport status presentation systems 100, 200, 300, 300', 300", 400, 400', 400" according to the embodiments and modified examples while watching an actual competition or while watching and listening to video of the competition or live commentary by voice, whereas a person who is blind preferably uses the system while listening to live commentary of the competition by voice on the radio or the like. When a person who is blind uses the sport status presentation systems 100, 200, 300, 300', 300", 400, 400', 400" according to the embodiments and modified examples while listening to live commentary of the competition by voice on the radio or the like, the person can perceive the competition not only by hearing but also by touch, which is an important sense for blind people. In other words, the sport status presentation systems 100, 200, 300, 300', 300", 400, 400', 400" according to the embodiments and modified examples greatly contribute to an increase in a feeling of being present for blind people attending a competition.

[Program, Recording Medium]

Figure 14:
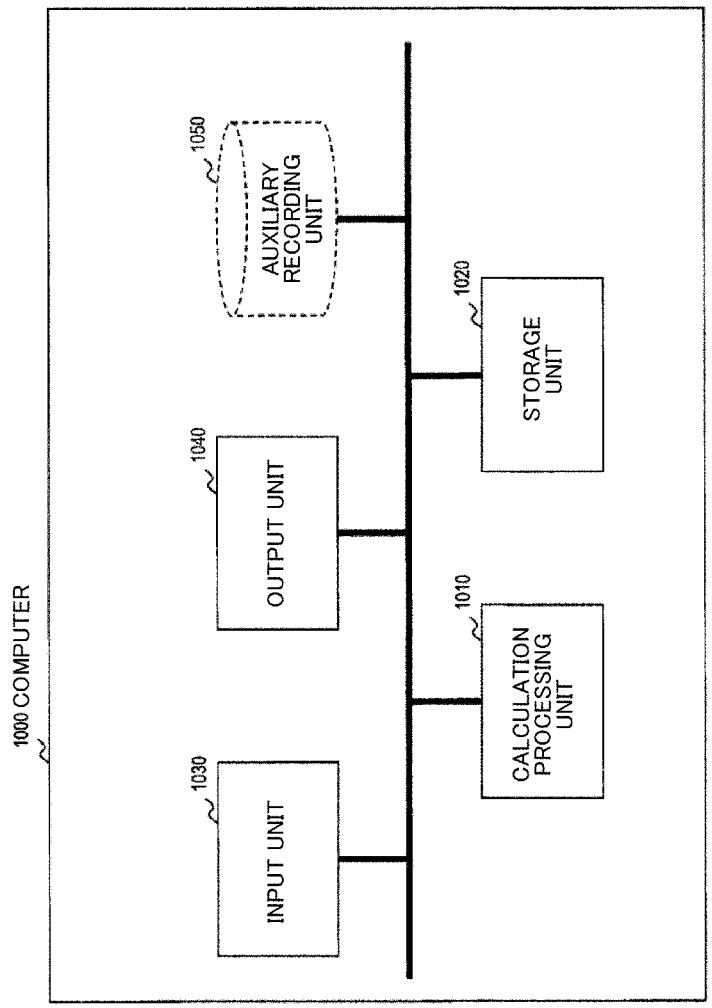
FIG. 14 is a view showing an example functional configuration of a computer.

When the various processing functions of the sports status presentation systems according to the respective embodiments and modified examples are realized by a computer, the processing content of the functions to be provided in the respective sport status presentation systems are described by a program. The various processing functions of the sports status presentation system are then realized by reading the program to a storage unit 1020 of a computer shown in FIG. 14 and operating a calculation processing unit 1010, an input unit 1030, an output unit 1040, and so on. Note that although the video input unit 114 is preferably a video camera or a television camera constituting an external device for outputting video signals to the computer, as described in the above embodiments, the video input unit 114 may also be a camera that is built into the computer. Similarly, although the voice input unit 117, the acoustic input unit 241, and the voice input unit 351 are preferably microphones constituting external devices for outputting audio signals to the computer, as described in the above embodiments, the voice input unit 117, acoustic input unit 241, and voice input unit 351 may also be microphones that are built into the computer. Further, as described in the above embodiments, the competition status input unit 111 is a smartphone or a tablet terminal, for example, which outputs input received via a touch panel to the sport status presentation system realized on a computer constituting a separate device. However, the sport status presentation system may also be packaged in a smartphone or a tablet terminal including a touch panel. Note that since the vibration presentation unit 130 is configured to include two vibrating bodies, the vibration presentation unit 130 may be constituted by an external device that operates in response to output signals from the computer.

The program describing the processing content of the sport status presentation system can be recorded in advance on a computer-readable recording medium. The computer-readable recording medium is a non-temporarily recording medium, for example, and more specifically a magnetic recording device, an optical disk, or the like.

Further, the program is distributed through the sale, transfer, rental, and so on of a portable recording medium, such as a DVD or a CD-ROM, on which the program is recorded, for example. Furthermore, the program may be stored on a storage device of a server computer, and the program may be distributed by transferring the program from the server computer to another computer over a network.

First, for example, the computer that executes the program stores the program recorded on the portable recording medium or the program transferred from the server computer temporarily in an auxiliary recording unit 1050 serving as a non-temporary storage device provided therein. Then, when executing the processing, the computer reads the program, which is stored in the auxiliary recording unit 1050 serving as a non-temporary storage device provided therein, to the storage unit 1020 and executes processing corresponding to the read program. Alternatively, as different embodiments of the program, the computer may read the program directly to the storage unit 1020 from the portable recording medium and execute processing corresponding to the program, or the computer may execute processing corresponding to the program received from the server computer each time the program is transferred thereto from the server computer. Furthermore, instead of transferring the program to the computer from a server computer, the processing described above may be executed by a so-called ASP (Application Service Provider) type service, in which a processing function is realized by execution commands and result acquisition alone. Note that the program according to this embodiment is also assumed to include an equivalent to a program in the form of information used for processing by an electronic calculation device (data that are not constituted by a direct command to a computer but have a property of defining computer processing, or the like).

Moreover, in this embodiment, the device is realized by executed a predetermined program on a computer, but at least some of the processing content may be realized by hardware.

The invention claimed is:

1. A sport status presentation system comprising a processor configured to execute a method comprising:

presenting to a user, by touching, a status of a sport competition between two teams,
wherein the two teams comprise a first team and a second team competing against each other, a player on the first team captures a ball from another player on the second team while moving within a single competition area, the first team scores points by placing the ball in a goal corresponding to the second team, the presenting further comprises causing a mechanical oscillation at a location on the left side of a body of the user by a first vibrating body of two vibrating bodies, the first vibrating body is associated with the first team, and at a point of time during the sport competition when the player of the first team is in possession of the ball, the presenting further comprises causing a mechanical oscillation by the first vibrating body associated with the first team in a larger amount as a distance between the ball and the goal associated with the first team in possession of the ball decreases.

2. The sport status presentation system according to claim 1, wherein, at a point of time during the sport competition, the vibrating body allocated to the one of the two teams in possession of the ball vibrates by the larger amount as the distance between the ball and the goal of the one of the two teams in possession of the ball decreases and by the larger amount as a degree of excitement at a competition venue where the sport competition is taking place increases.

3. The sport status presentation system according to claim 1, wherein, at a point of time during the sport competition, the vibrating body allocated to the one of the two teams in possession of the ball vibrates by the larger amount as the distance between the ball and the goal of the one of the two teams in possession of the ball decreases and by the larger amount as the status of the sport competition as described by a commentator corresponds to increases in a degree of an attack being conducted by the one of the two teams in possession of the ball.

4. The sport status presentation system according to claim 1, wherein, at a point of time during the sport competition, the vibrating body allocated to the one of the two teams in possession of the ball vibrates by the larger amount as the distance between the ball and the goal of the one of the two teams in possession of the ball decreases and by the larger amount as a voice of a commentator grows louder.

5. The sport status presentation system according to claim 1, wherein, at a point of time during the sport competition, the vibrating body allocated to the one of the two teams in possession of the ball vibrates by the larger amount as the distance between the ball and the goal of the one of the two teams in possession of the ball decreases, by the larger amount as the status of the sport competition as described by a commentator corresponds to increases in a degree of an attack being conducted by the one of the two teams in possession of the ball, and by the larger amount as the voice of a commentator grows louder.

6. The sport status presentation system according to claim 1, wherein, at a point of time during the sport competition, the vibrating body allocated to the one of the two teams in possession of the ball, among the two vibrating bodies, vibrates by a larger amount as the distance between the ball and the goal of the one of the two teams in possession of the ball decreases, by the larger amount as a degree of excitement at a competition venue where the sport competition is taking place increases, and by the larger amount as the voice of a commentator grows louder.

7. The sport status presentation system according to claim 1, wherein, at a point of time during the sport competition, the vibrating body allocated to the one of the two teams in possession of the ball vibrates by the larger amount as the distance between the ball and the goal of the one of the two teams in possession of the ball decreases, by the larger amount as a degree of excitement at a competition venue where the sport competition is taking place increases, by the larger amount as the status of the sport competition as described by a commentator corresponds to increases in a degree of an attack being conducted by the one of the two teams in possession of the ball, and by a larger amount as a voice of the commentator grows louder.

8. The sport status presentation system according to claim 1, the processor further configured to execute a method comprising:

displaying a competition status input user interface on a touch screen;

receiving touch input from an inputter, wherein the competition status input user interface includes a graphic imitating the competition area; and receiving input indicating the one of the two teams in possession of the ball and the location of the ball within the competition area during the sport competition.

9. A computer implemented method for presenting a sport status, comprising:

presenting to a user, by touching, a status of a sport competition between two teams, wherein the two teams comprise a first team and a second team competing against each other, a player on the first team captures a ball from another player in the second team while moving in a single competition area, the first team scores a point by the first player placing the ball in a goal corresponding to the second team, the presenting further includes causing a mechanical oscillation at a location on a side of a body of the user by a first vibrating body of two vibrating bodies, the first vibrating body is associated with the first team, and at a point of time during the sport competition when the player of the first team is in possession of the ball, the presenting further comprises causing a mechanical oscillation by the first vibrating body associated with the first team in a larger amount as a distance between the ball and a goal line of the second team in possession of the ball decreases.

10. The sport status presentation system according to claim 1, wherein the sport competition is associated with at least one of:

soccer, rugby, basketball, or ice hockey.

11. The sport status presentation system according to claim 1, wherein a degree of excitement at a competition venue is associated with an acoustic signal input generated by a microphone oriented toward a spectator seat of the competition venue.

12. The computer implemented method according to claim 9, wherein, at a point of time during the sport competition, the vibrating body allocated to the one of the two teams in possession of the ball vibrates by the larger amount as the distance between the ball and the goal line of the one of the two teams in possession of the ball decreases and by the larger amount as a degree of excitement at a competition venue where the sport competition is taking place increases.

13. The computer implemented method according to claim 9, wherein, at a point of time during the sport competition, the vibrating body allocated to the one of the two teams in possession of the ball vibrates by the larger amount as the distance between the ball and the goal line of the one of the two teams in possession of the ball decreases and by the larger amount as the status of the sport competition as described by a commentator corresponds to increases in a degree of an attack being conducted by the one of the two teams in possession of the ball.

14. The computer implemented method according to claim 9, wherein, at a point of time during the sport competition, the vibrating body allocated to the one of the two teams in possession of the ball vibrates by the larger amount as the distance between the ball and the goal line of the one of the two teams in possession of the ball decreases and by the larger amount as a voice of a commentator grows louder.

15. The computer implemented method according to claim 9, wherein, at a point of time during the sport competition, the vibrating body allocated to the one of the two teams in possession of the ball vibrates by the larger amount as the distance between the ball and the goal line of the one of the two teams in possession of the ball decreases, by the larger amount as the status of the sport competition as described by a commentator corresponds to increases in a degree of an attack being conducted by the one of the two teams in possession of the ball, and by the larger amount as a voice of h commentator grows louder.

16. The computer implemented method according to claim 9, wherein, at a point of time during the sport competition, the vibrating body allocated to the one of the two teams in possession of the ball vibrates by the larger amount as the distance between the ball and the goal line of the one of the two teams in possession of the ball decreases, by the larger amount as a degree of excitement at a competition venue where the sport competition is taking place increases, and by the larger amount as a voice of a commentator grows louder.

17. The computer implemented method according to claim 9, wherein, at a point of time during the sport competition, the vibrating body allocated to the one of the two teams in possession of the ball vibrates by the larger amount as the distance between the ball and the goal line of the one of the two teams in possession of the ball decreases, by the larger amount as a degree of excitement at a competition venue where the sport competition is taking place increases, by the larger amount as the status of the sport competition as described by a commentator corresponds to increases in a degree of an attack being conducted by the one of the two teams in possession of the ball, and by a larger amount as a voice of the commentator grows louder.

18. The computer implemented method according to claim 9, further comprising:
 displaying a competition status input user interface on a touch screen;
 receiving touch input from an inputter, wherein
  the competition status input user interface includes a graphic imitating the competition area; and
 receiving input indicating the one of the two teams in possession of the ball and the location of the ball within the competition area at a point during the sport competition.

19. The computer implemented method according to claim 9, wherein each of the vibrating bodies correspond to one of the two teams, and
 the sport competition is associated with at least one of:
  soccer,
  rugby,
  basketball, or
  ice hockey.

20. The computer implemented method according to claim 9, wherein a degree of excitement at a competition venue is associated with an acoustic signal input generated by a microphone oriented toward a spectator seat of the competition venue.

* * * * *